US010462655B2

(12) United States Patent
Klaue et al.

(10) Patent No.: US 10,462,655 B2
(45) Date of Patent: Oct. 29, 2019

(54) METHOD FOR GENERATING A DIGITAL KEY FOR SECURE WIRELESS COMMUNICATION

(71) Applicant: AIRBUS DEFENCE AND SPACE GMBH, Ottobrunn (DE)

(72) Inventors: Jirka Klaue, Ottobrunn (DE); Christoph Heller, Taufkirchen (DE); Martin Kubisch, Munich (DE); Sebastian Stemmer, Haimhausen (DE)

(73) Assignee: Airbus Defence and Space GmbH, Taufkirchen (DE)

( * ) Notice: Subject to any disclaimer, the term of this patent is extended or adjusted under 35 U.S.C. 154(b) by 210 days.

(21) Appl. No.: 15/253,367

(22) Filed: Aug. 31, 2016

(65) Prior Publication Data

US 2017/0064547 A1    Mar. 2, 2017

(30) Foreign Application Priority Data

Sep. 1, 2015 (DE) .......................... 10 2015 216 706

(51) Int. Cl.
*H04W 12/04* (2009.01)
*H04L 9/08* (2006.01)
*H04L 29/06* (2006.01)

(52) U.S. Cl.
CPC .......... *H04W 12/04* (2013.01); *H04L 9/0838* (2013.01); *H04L 9/0875* (2013.01); *H04L 63/0435* (2013.01); *H04L 2209/24* (2013.01); *H04L 2209/80* (2013.01); *H04L 2209/805* (2013.01)

(58) Field of Classification Search
CPC .... H04W 12/04; H04L 9/0838; H04L 9/0875; H04L 63/0435; H04L 2209/24; H04L 2209/80; H04L 2209/805
See application file for complete search history.

(56) References Cited

U.S. PATENT DOCUMENTS

| 7,949,032 B1* | 5/2011 | Frost ..................... H04L 9/0838 375/140 |
| 2007/0036353 A1* | 2/2007 | Reznik ................. H04B 7/0434 380/30 |

(Continued)

FOREIGN PATENT DOCUMENTS

WO    WO 2006/130725 A2    12/2006

OTHER PUBLICATIONS

Smolyakov et al., Experimental Verification Secre tEncryption Keys Distribution With A Phase Method In Multipath Environment, 2013 International Siberian Conference on Control and Communications (SIBCON), 2013, pp. 1-5 (Year: 2013).*

(Continued)

*Primary Examiner* — Luu T Pham
*Assistant Examiner* — Harvey I Cohen
(74) *Attorney, Agent, or Firm* — Jenkins, Wilson, Taylor & Hunt, P.A.

(57) ABSTRACT

In a method for generating a digital key in a first communication device and in a second communication device, the first communication device transmits a first electromagnetic signal to the second communication device, which extracts the digital key from the received first electromagnetic signal. The second communication device transmits a second electromagnetic signal to the first communication device, which likewise extracts the digital key from the received second electromagnetic signal. A direct signal component, transmitted on a direct signal path between the first communication device and the second communication device, of the first electromagnetic signal and of the second electromagnetic signal is attenuated.

10 Claims, 2 Drawing Sheets

(56) References Cited

U.S. PATENT DOCUMENTS

| | | | |
|---|---|---|---|
| 2010/0067701 | A1 | 3/2010 | Patwari et al. |
| 2011/0280397 | A1* | 11/2011 | Patwar .................... H04L 63/06 380/44 |
| 2012/0294443 | A1 | 11/2012 | Mathur et al. |
| 2013/0121475 | A1* | 5/2013 | Deych .................... G21K 1/025 378/154 |
| 2013/0301688 | A1* | 11/2013 | Khandani ............. H04W 16/14 375/211 |
| 2014/0146321 | A1* | 5/2014 | Matsuzaki ........... G01N 21/554 356/445 |
| 2014/0219449 | A1* | 8/2014 | Shattil .................. H04W 12/08 380/270 |
| 2015/0048977 | A1* | 2/2015 | Khandani ............... H01Q 3/46 342/385 |
| 2015/0109181 | A1* | 4/2015 | Hyde ................. H01Q 15/0053 343/833 |

OTHER PUBLICATIONS

Sulimov et al., Simulation Of Encryption Key Distribution Process Based On Multipath Radio Propagation, 2013 International Siberian Conference on Control and Communications (SIBCON), 2013, pp. 1-4 (Year: 2013).*

Ben-Hamida et al., An Adaptive Quantization Algorithm For Secret Key Generation, 2009, pp. 1-5 (Year: 2009).*

Mehmood et al., Key Establishment Employing Reconfigurable Antennas: Impact of Antenna Complexity,IEEE Transactions on Wireless Communications, 2014 vol. 13 , Issue: 11, pp. 6300-6310 (Year: 2014).*

Kui Ren, Hai Su, Qian Wang: "Secret key generation exploiting channel characteristics in wireless communications", Wireless Communications, IEEE, vol. 18, No. 4, pp. 6, 12, Aug. 2011.

Azimi-Sadjadi, Babak, Aggelos Kiayias, Alejandra Mercado and Bulent Yener, "Robust key generation from signal envelopes in wireless networks", in Proceedings of the 14th ACM conference on computer and communications security, pp. 401-410, ACM, 2007.

German Office Action for German Application No. 10 2015 216 706.2 dated May 3, 2016.

German Office Action for German Application No. 10 2015 216 706.2 dated Sep. 20, 2016.

European Search Report for European Application No. 16 186 600.9 dated Jan. 18, 2017.

European Office Action for European Application No. 16 186 600.9 dated Feb. 2, 2018.

* cited by examiner

METHOD FOR GENERATING A DIGITAL KEY FOR SECURE WIRELESS COMMUNICATION

CROSS-REFERENCE TO RELATED APPLICATION

This application claims priority to German Patent Application DE 10 2015 216 706.2 filed Sep. 1, 2015, the entire disclosure of which is incorporated by reference herein.

TECHNICAL FIELD

This document relates to a method for generating a digital key for secure wireless communication. The disclosure relates in particular to a method for generating a digital key which is used in a symmetrical encryption method.

BACKGROUND

Established symmetrical encryption methods require the presence of a shared secret at the participating communication partners. Either this shared secret is used directly as the key, or the key is derived therefrom. The encrypted communication is considered secure if the key is random and sufficiently long. In AES, for example, 128 bits is considered long enough to make cracking the process appear futile.

To provide a shared secret key to the communication partners, conventionally an asymmetrical cryptosystem such as the Diffie-Hellman, RSA or Elgamal key exchange method is used. However, these methods are susceptible to man-in-the-middle attacks or require the presence of an infrastructure having trust points. In addition, these methods are highly complex, and also require real random number generators at the communication partners. Small devices such as embedded sensors which are intended to communicate in an encrypted manner often have neither sufficient computing power nor actual physical sources of randomness.

An elegant method from the field of physical layer security for generating shared secret keys for wireless communication is key generation using the reciprocity of multi-path channels. In this context, the secret key is generated directly from the properties of the wireless communication channel. Kui Ren, Hai Su, Qian Wang: "Secret key generation exploiting channel characteristics in wireless communications", Wireless Communications, IEEE, vol. 18, No. 4, pp. 6, 12, Aug. 2011 and Azimi-Sadjadi, Babak, Aggelos Kiayias, Alejandra Mercado and Bulent Yener, "Robust key generation from signal envelopes in wireless networks", in Proceedings of the 14$^{th}$ ACM conference on computer and communications security, pp. 401-410, ACM, 2007, describe known methods by which secret keys, for example for symmetrical encryption methods, can be extracted from the random properties of a radio channel.

A prerequisite for this is that the wireless channel is reciprocal and has sufficient random properties. Furthermore, the channel must be highly location-dependent, within the meaning that any listeners in the vicinity of the communication partners establish or obtain different physical channel properties. Random, in other words unpredictable, physical channel properties result for example from signal superposition due to multi-path propagation. At the relevant receiver, this leads to a unique signal pattern which can be used to generate random bits for a secret key.

There is therefore a need to specify an improved method for generating a digital key in two communication devices by exploiting the reciprocity of the radio channel.

SUMMARY

The disclosure relates to a method for generating a digital key in a first communication device and in a second communication device. In this context, the first communication device transmits a first electromagnetic signal to the second communication device, which extracts the digital key from the received first electromagnetic signal. The second communication device transmits a second electromagnetic signal to the first communication device, which likewise extracts the digital key from the received second electromagnetic signal. A direct signal component, transmitted on a direct signal path between the first communication device and the second communication device, of the first electromagnetic signal and of the second electromagnetic signal is attenuated.

The first or second communication devices may be any electronic devices. The first or second communication device is for example a conventional mobile telephone, a smartphone, a portable computer such as a laptop computer, a personal digital assistant PDA, a tablet PC, or other embedded system. The first communication device and the second communication device need not necessarily be of the same construction. It is merely a prerequisite that the two communication devices have corresponding communication modules having one or more antenna elements which are suitable for sending and receiving electromagnetic signals.

The first electromagnetic signal may be identical to the second electromagnetic signal. Alternatively, however, they may also be two different electromagnetic signals. Furthermore, both the first and the second electromagnetic signal may be transmitted on the same carrier frequency.

For modulating the electromagnetic signals, any modulation methods may be used for modulating the amplitude, frequency or phase of a carrier signal (for example frequency shift keying (FSK) or quadrature phase-shift keying (QPSK)).

Furthermore, the electromagnetic signals may be those of a known communication standard such as a communication standard from the IEEE 802 series (for example Wi-Fi IEEE 802.11, ZigBee IEEE 802.15.4 or Bluetooth IEEE 802.15.1). It is assumed that the relevant communication modules of the two communication devices support the standard in question.

In the proposed method, the same digital key is therefore generated in the two communication devices mutually independently. A prerequisite for this is for example the reciprocity of the radio channel between the two communication devices. For each communication device, the actual generation of the digital key comprises two steps. In a first step, an electromagnetic signal sent from the respective other communication device is changed by the properties of the radio channel (such as multi-path propagation, free space attenuation, shadowing, diffraction or absorption losses) and subsequently received. In a second step, the communication device extracts the digital key from the received electromagnetic signal, in particular by estimating the transmission channel between the two communication devices and deriving the key from the estimated transmission channel. Owing to the reciprocity of the channel, the two communication devices can estimate the channel and reach the same result with sufficient precision to make it possible for the two communication devices to determine a shared key. This key is derived for example from the properties of the estimated channel. Since the transmission channel between the two communication devices is specific to the arrangement of the two communication devices, it can also only be determined by them, ensuring security of the determined key. Further details on determining the key from the channel parameters are found in the publications cited at the outset, which are therefore incorporated herein by reference.

The extraction of the digital key may include a quantisation step and/or an error correction. In the quantisation step, received signal values are compared with one or more thresholds in order to determine a bit sequence from which the digital key is ultimately calculated. The publications cited at the outset additionally describe various methods for error correction, all of which may be applied to the method described herein. For this purpose, these publications are incorporated herein by reference.

As is described in greater detail in the following, the attenuation of the direct signal component may be brought about by the first or the second communication device. In addition, a third item may be arranged in the direct signal path in order to prevent direct transmission of an electromagnetic signal between the two communication devices. In each case, however, the attenuation is equal for the two signals, in other words the first electromagnetic signal is attenuated on the direct signal path by the same amount (expressed for example in decibels (dB)) as the second electromagnetic signal in the opposite direction. Attenuation therefore means a reduction in the received signal energy of the signal portion which is transmitted between the two devices on the direct signal path.

Attenuating the direct signal component simplifies the measurement of the remaining signal components at the receiver, since the interfering, dominant signal part which is transmitted on the direct signal path is attenuated. In addition, as is described in greater detail in the following embodiments, the attenuation of the direct signal path generally results in deviation or scattering of the electromagnetic signals in the remaining spatial directions. Thus, as a result of the attenuation of the direct signal component, on the one hand the dominant, direct signal component is reduced in the calculation of the digital key, and on the other hand the remaining signal components are weighted more heavily. Forcing multi-path propagation results in a more diffuse channel characteristic and thus an increase in the entropy or randomness of the received signal. The increased entropy ultimately makes possible more robust generation of the digital keys or alternatively determination of secure digital keys having higher bit lengths.

The direct signal component can be attenuated by arranging part of a scattering object on the direct signal path. The scattering object may for example have a conical or hemispherical or pyramid-shaped portion. This mechanical form of attenuation or shielding has the advantage that the direct signal component of the first electromagnetic signal and the second electromagnetic signal is almost completely eliminated, at least for metal scattering objects. In this context, the scattering object may be mechanically connected to the first or second communication device. For example, the scattering object is a screen which is rigidly or pivotally arranged on the first or second communication device. During a key generation phase, for example a pivotable screen may be pivoted into the direct signal path in order to attenuate the direct signal component of the electromagnetic signals. After successful key generation in the two communication devices, in this example the scattering object can be removed from the direct signal path again in a simple manner in order to make possible energy-efficient communication, encrypted using the digital key, between the two communication devices.

Alternatively or in addition, the direct signal component can be attenuated by adapting the directional characteristic of an antenna unit of the first or second communication device.

In the most general sense, a directional characteristic of an antenna describes the angular dependency of the strength of received or transmitted waves. The antenna unit may comprise one or more antenna elements. The antenna elements may be active antenna elements or passive antenna elements (known as parasitic antenna elements). By electronically controlling the antenna elements, the directional characteristic can for example be changed in such a way that the antenna unit no longer transmits or receives omnidirectionally in all spatial directions, but instead attenuates electromagnetic signals from or in the direction of the direct signal path and amplifies those from or in the remaining spatial directions. This can be achieved by analogue or digital beam-forming. Examples of antenna units of this type may have two or more antenna elements, arranged for example in a uniform linear array (ULA) or a uniform circular array (UCA).

Adapting the directional characteristic of an antenna unit has the advantage that for example the direction of the direct signal path can be determined electronically and the direct signal component is attenuated by adapting the directional characteristic. After successful completion of the key generation phase, the directional characteristic of the antenna unit can be changed again in order to make energy-efficient communication between the two communication devices possible.

Alternatively or in addition, the direct signal component may also be attenuated using an antenna unit in one of the communication devices, which unit permanently transmits and receives in particular spatial directions whilst other spatial directions are permanently attenuated. The directional characteristic of directional antennae of this type would thus not have to be adapted individually in order to attenuate the direct signal component and amplify the remaining signal components. Instead, a directional antenna of this type would merely have to be orientated (for example manually) with respect to the other communication device in order to attenuate the direct signal component between the two communication devices.

The digital key may for example be extracted from a phase or amplitude of the received first and second electromagnetic signals.

In some embodiments, a time interval between the transmission of the first electromagnetic signal and the transmission of the second electromagnetic signal is less than a coherence time of the transmission channel between the first communication device and the second communication device. This temporal constraint ensures that the channel is reciprocal, that the correlation between the received first electromagnetic signal and the received second electromagnetic signal is sufficiently high, and that the two communication devices actually extract the same digital key.

The first and second electromagnetic signal may comprise a sequence of at least two different signal values transmitted in succession. Furthermore, the first electromagnetic signal may be transmitted on at least two different frequencies if the second electromagnetic signal is also transmitted on the same two frequencies. The direct signal path may comprise a line-of-sight connection between the first communication device and the second communication device.

The attenuation of the direct signal component may for example be relative to other signal components which are not transmitted on the direct signal path and are transmitted between the first and second communication device by multi-path propagation.

As already discussed, the multi-path propagation can be forced by amplifying signal components which are not transmitted on the direct signal path and are transmitted between the first and second communication device by multi-path communication. This may be brought about either by scattering the electromagnetic signals at the scattering object or by adapting the directional characteristic of an antenna unit.

Furthermore, the disclosure relates to a communication system comprising a first communication device and a second communication device, the first communication device being set up to transmit a first electromagnetic signal from the first communication device to the second communication device and to extract a digital key from a received second electromagnetic signal which was transmitted by the second communication device. The second communication device is set up to transmit the second electromagnetic signal to the first communication device and to extract the digital key from the received first electromagnetic signal. In the described communication system, the first and/or second communication device may be set up to attenuate a direct signal component, transmitted on a direct signal path between the first communication device and the second communication device, of the first electromagnetic signal and the second electromagnetic signal.

A further disclosed communication system comprises a first communication device, a second communication device and a scattering object. The first communication device is set up to transmit a first electromagnetic signal from the first communication device to the second communication device and to extract a digital key from a received second electromagnetic signal which was transmitted by the second communication device. Conversely, the second communication device is set up to transmit the second electromagnetic signal to the first communication device and to extract the digital key from the received first electromagnetic signal. At least part of the scattering object is arranged on a direct signal path between the first communication device and the second communication device in order to attenuate a direct signal component of the first electromagnetic signal and the second electromagnetic signal on the direct signal path. The scattering object may have a conical or hemispherical or pyramid-shaped portion.

In a further aspect, a computer program product comprising a computer program may be provided, which may be storable on a computer-readable medium and be executable by a computer, it being possible for the computer program to contain executable instructions which can cause the computer to carry out the steps of at least one of the aforementioned method aspects.

It should be noted that the methods, devices and systems described in this document can be used both alone and in combination with other methods, devices and systems described in this document. Furthermore, any aspects of the method, device and systems described in this document can be combined with one another in various manners. In particular, the features of the claims can be combined with one another in various manners.

BRIEF DESCRIPTION OF THE DRAWINGS

In the following, the disclosure herein is described in greater detail with reference to the drawings, in which.

DETAILED DESCRIPTION

Figure 1:
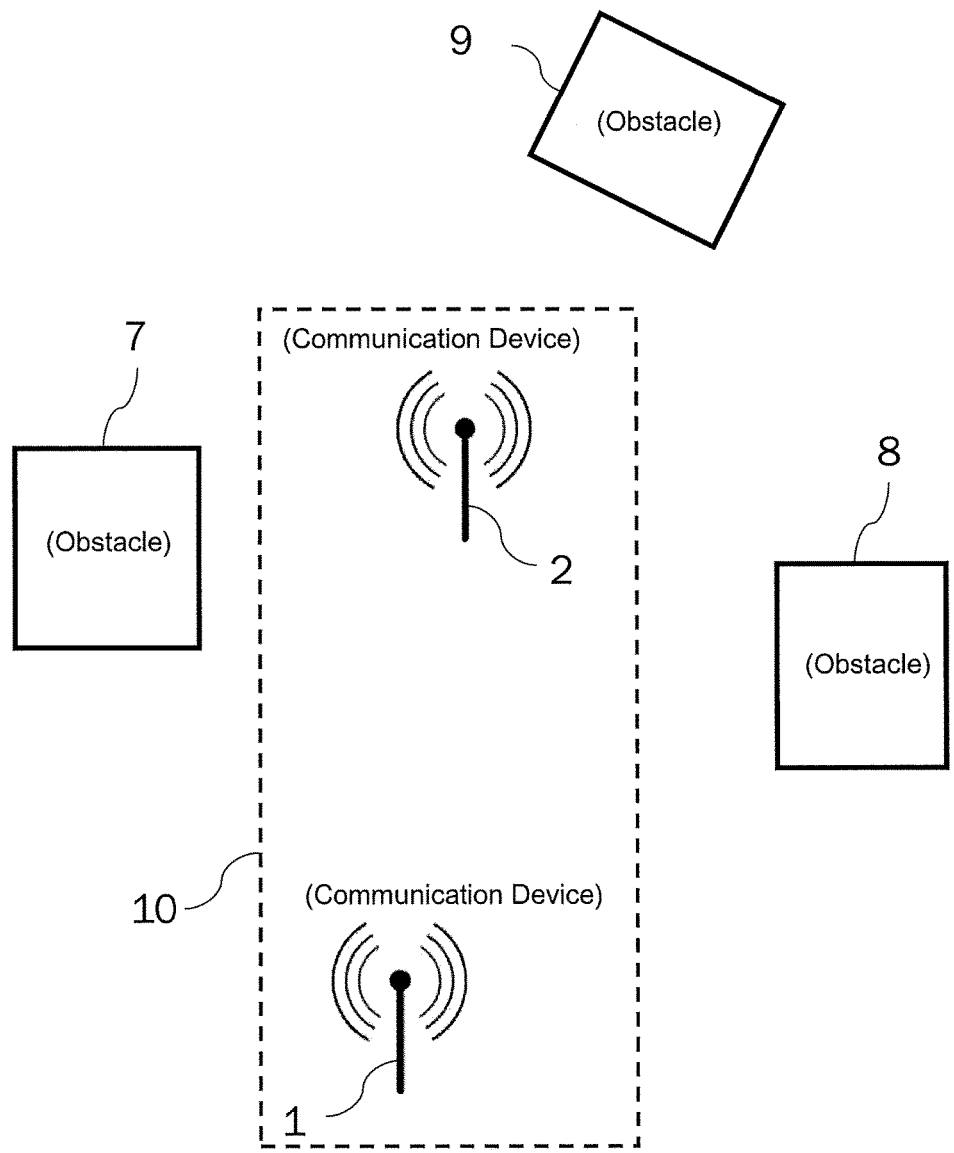
FIG. 1 shows an example communication system comprising a first communication device and a second communication device.

FIG. 1 illustrates an example communication system 10. Two communication devices 1, 2 generate a shared key for secure wireless communication. The two communication devices 1, 2 are in line-of-sight connection with one another, and an electromagnetic signal emitted for example by the communication device 1 reaches the communication device 2 on direct paths, in other words via the direct signal path between the communication device 1 and the communication device 2. Furthermore, the electromagnetic signal is scattered or reflected by the obstacles 7, 8, 9. In the context of the multi-path propagation, the electromagnetic signal therefore reaches the communication device 2 on various signal paths, and leads to a specific pattern therein, which can be used to generate a digital key. Conversely, the communication device 2 transmits an electromagnetic signal to the communication device 1. The reciprocity of the radio channel makes it possible for the communication device 1 to generate the same digital key from the signal transmitted by the communication device 2.

Figure 2:
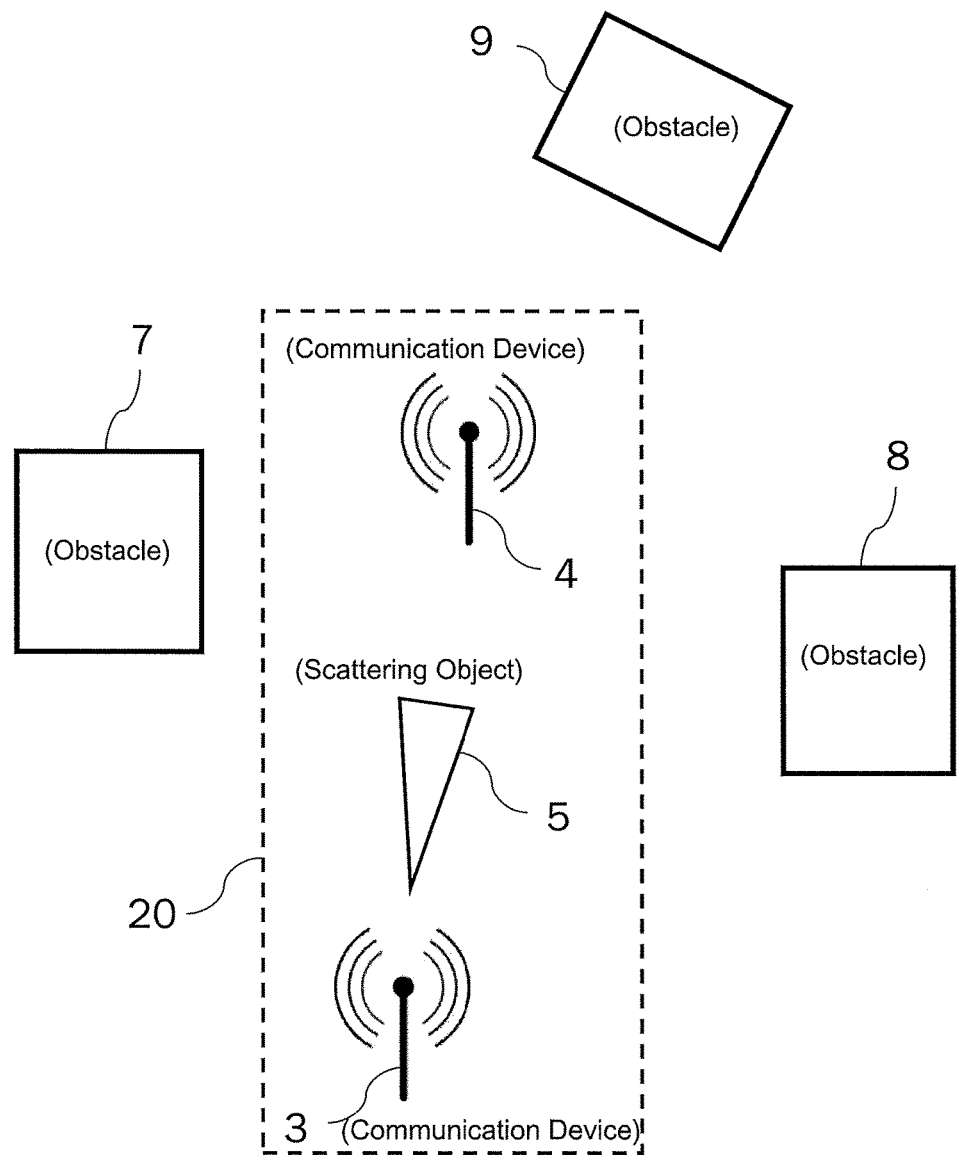
FIG. 2 shows an improved example communication system comprising a first and a second communication device.

By contrast, FIG. 2 shows an improved example communication system 20 comprising the communication devices 3 and 4 and a scattering object 5, which by way of example is arranged close to the first communication device 3. In addition, the electromagnetic signals are now scattered or reflected on the scattering object 5. The scattering object 5 is for example a metal reflector that attenuates a signal component which was previously transmitted on a direct signal path between the two communication devices 1 and 2, and amplifies all other signal components which are transmitted via various paths between the two devices 3 and 4, for example by reflection on the obstacles 7, 8 and 9.

Alternatively or in addition, one or both of the communication devices 3 and 4 may be set up to force multi-path propagation by adapting the directional characteristic of the antenna units thereof and to attenuate a direct signal component which would otherwise be transmitted along the line-of-sight connection between the two devices. Even though FIG. 2 shows merely one antenna element, the two communication devices 3 and 4 may also comprise a plurality of antenna elements in order to allow electronic beam-focusing in certain spatial directions.

If a secure connection is now to be established, communication device 3 for example sends a general key generation request to communication device 4, which sends a confirmation message to communication device 3 in response to the key generation request. The confirmation message signals to the requesting communication device 3 that shared key generation is possible. In the subsequent key generation phase, the two communication devices 3, 4 each send a suitable electromagnetic test signal in succession and extract the shared digital key therefrom.

In a subsequent communication phase, encrypted communication takes place using the shared digital key. During this communication phase, suppression of the direct signal path is no longer required, and in the example shown the scattering object 5 is removed from the direct signal path between the two communication devices 3, 4 again. If the direct signal path is suppressed by beam-forming in one of the communication devices 3, 4 during the key generation phase, an omnidirectional or isotropic directional characteristic of the antenna unit can be used during the communication phase in order to also achieve communication via the direct signal path.

It should be noted that the communication devices 3, 4 should not be moved during the key generation phase. In the communication phase, there is nothing preventing movability of the two communication devices 3, 4.

The described method for generating a digital key may be used in various scenarios. Preferably, the key generation takes place in a protected environment, for example in order to connect wireless devices securely to a network. These wireless devices can subsequently communicate securely throughout the network area in a communication phase. A possible application scenario is for example a cockpit in an aeroplane or helicopter. The described method makes it possible for devices (for example in a cockpit) to generate a shared key in a simple manner, which the devices can subsequently use for secure, encrypted communication. For this purpose, it is merely necessary for the devices to be located in a particular spatial vicinity. The described method restricts the direct signal path, and provides transmission by multi-path propagation, in such a way that there is a channel having random properties and that secure conditions for key generation having a high level of randomness are provided. A particular key exchange via another medium such as a digital memory is not required. Other devices which are not located at the same locations find another channel and cannot generate the same key. The described method is thus suitable in particular for small devices such as sensors or diagnostic tools which occasionally require a secure data connection to a partner.

The present disclosure is not limited to the shown embodiments. In particular, it should be noted that the description and drawings are merely intended to illustrate the principle of the proposed methods, devices and systems.

The subject matter disclosed herein can be implemented in software in combination with hardware and/or firmware. For example, the subject matter described herein can be implemented in software executed by a processor or processing unit. In one exemplary implementation, the subject matter described herein can be implemented using a computer readable medium having stored thereon computer executable instructions that when executed by a processor of a computer control the computer to perform steps. Exemplary computer readable mediums suitable for implementing the subject matter described herein include non-transitory devices, such as disk memory devices, chip memory devices, programmable logic devices, and application specific integrated circuits. In addition, a computer readable medium that implements the subject matter described herein can be located on a single device or computing platform or can be distributed across multiple devices or computing platforms.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

What is claimed is:

1. A method for generating a first digital key in a first communication device and a second digital key in a second communication device, the method comprising:

transmitting a first electromagnetic signal from the first communication device to the second communication device via a reciprocal transmission channel, wherein the first electromagnetic signal is changed by properties of the reciprocal transmission channel;

estimating the reciprocal transmission channel between the first communication device and the second communication device from the first electromagnetic signal received by the second communication device;

determining properties of the estimated reciprocal transmission channel;

generating the second digital key from the properties of the estimated reciprocal transmission channel;

transmitting a second electromagnetic signal from the second communication device to the first communication device via the reciprocal transmission channel, wherein the second electromagnetic signal is changed by properties of the reciprocal transmission channel;

estimating the reciprocal transmission channel between the first communication device and the second communication device from the second electromagnetic signal received by the first communication device;

determining properties of the estimated reciprocal transmission channel; and generating the first digital key from the properties of the estimated reciprocal transmission channel;

wherein a direct signal component, transmitted on a direct signal path between the first communication device and the second communication device, of the first electromagnetic signal and of the second electromagnetic signal is attenuated;

wherein the transmission channel between the first communication device and the second communication device is reciprocal when a time interval between a transmission of the first electromagnetic signal and transmission of the second electromagnetic signal is less than a coherence time of the transmission channel;

wherein generating the first digital key and the second digital key further comprises:

a quantisation step comprising comparing received electromagnetic signal values with one or more thresholds to determine a bit sequence from which each the digital key is calculated; or both the quantisation step and an error correction step;

wherein the properties of the estimated reciprocal transmission channel comprise: multi-path propagation, free space attenuation, shadowing, diffraction and absorption losses;

utilizing the first digital key to encrypt communication from the first communication device to the second communication device;

utilizing the second digital key to encrypt communication from the second communication device to the first communication device;

wherein attenuation of the direct signal component is brought about by arranging part of a scattering object on the direct signal path; and wherein the scattering object has a conical or hemispherical or pyramid-shaped portion.

2. The method of claim 1 wherein attenuation of the direct signal component comprises adapting a directional characteristic of an antenna unit of the first or second communication device.

3. The method of claim 1 wherein the first digital key and the second digital key are extracted from a phase or amplitude of the received first and second electromagnetic signal.

4. The method of claim 1 wherein the first and second electromagnetic signal comprise a sequence of at least two different signal values transmitted in succession.

5. The method of claim 1 wherein the first electromagnetic signal is transmitted on at least two different frequencies and the second electromagnetic signal is also transmitted on the at least two different frequencies.

6. The method of claim 1 wherein the direct signal path is a line-of-sight connection between the first communication device and the second communication device.

7. The method of claim 1 wherein the direct signal component is attenuated relative to other signal components which are not transmitted on the direct signal path and are transmitted between the first and second communication device by multi-path propagation.

8. The method of claim 1 wherein signal components which are not transmitted on the direct signal path and are transmitted between the first and second communication device by multi-path communication are amplified.

9. The method of claim 1 wherein the direct signal component is completely suppressed.

10. A communication system comprising:
a first communication device; and
a second communication device,
wherein the first communication device is configured to transmit a first electromagnetic signal from the first communication device to the second communication device via a reciprocal transmission channel, and to generate a first digital key from a received second electromagnetic signal which was transmitted by the second communication device, and
wherein the second communication device is configured to transmit the second electromagnetic signal to the first communication device via the reciprocal transmission channel, and to generate a second digital key from the received first electromagnetic signal,
a direct signal component, transmitted on a direct signal path between the first communication device and the second communication device, of the first electromagnetic signal and of the second electromagnetic signal being attenuated,
wherein the first electromagnetic signal and the second electromagnetic signal are changed by properties of the reciprocal transmission channel,
wherein the first communication device is configured to:
estimate the reciprocal transmission channel between the first communication device and the second communication device from the second electromagnetic signal transmitted by the second communication device;
determine properties of the estimated reciprocal transmission channel; and
generate the first digital key from the properties of the estimated reciprocal transmission channel;
wherein the second communication device is configured to:
estimate the reciprocal transmission channel between the first communication device and the second communication device from the first electromagnetic signal transmitted by the first communication device;
determine properties of the estimated reciprocal transmission channel; and
generate the second digital key from the properties of the estimated reciprocal transmission channel;
wherein the transmission channel between the first communication device and the second communication device is reciprocal when a time interval between a transmission of the first electromagnetic signal and transmission of the second electromagnetic signal is less than a coherence time of the transmission channel;
wherein the first communication device and the second communication device are configured to generate the first digital key and the second digital key, at least in part, by:
a quantisation step comprising comparing received electromagnetic signal values with one or more thresholds to determine a bit sequence from which the digital key is calculated; or
both the quantisation step and an error correction step
wherein the properties of the estimated reciprocal transmission channel comprise: multi-path propagation, free space attenuation, shadowing, diffraction and absorption losses;
wherein the first communication device is further configured to utilize the first digital key to encrypt communication from the first communication device to the second communication device;
wherein the second communication device is further configured to utilize the second digital key to encrypt communication from the second communication device to the first communication device;
wherein attenuation of the direct signal component is brought about by arranging part of a scattering object on the direct signal path; and
wherein the scattering object has a conical or hemispherical or pyramid-shaped portion.

* * * * *